Nov. 28, 1950

C. C. DE PEW
VARIABLE OUTPUT LINKAGE WITH
MULTIPLE CONTROLLED ELEMENTS 2,531,614

Filed Oct. 12, 1946

INVENTOR.
CHESTER C. DePEW
BY
Campbell, Brumbaugh & Free
ATTORNEYS.

FIG. 2.
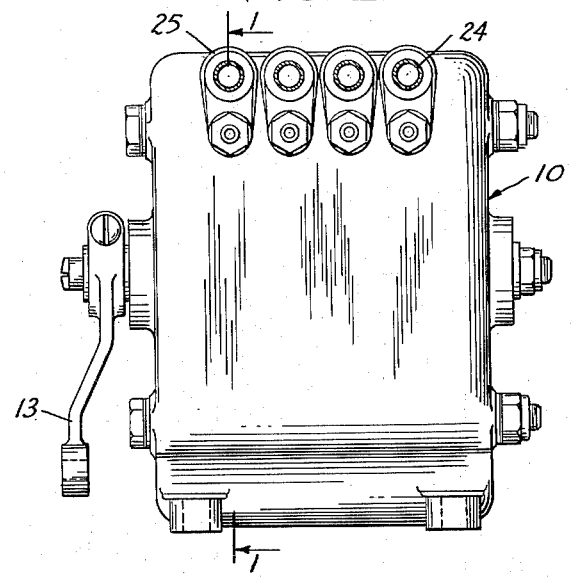
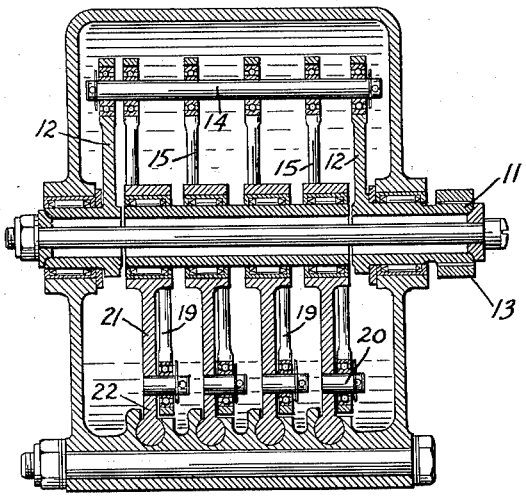
FIG. 3.

Patented Nov. 28, 1950

2,531,614

UNITED STATES PATENT OFFICE 2,531,614

VARIABLE OUTPUT LINKAGE WITH MULTIPLE CONTROLLED ELEMENTS

Chester C. De Pew, Farmingdale, N. Y., assignor to Fairchild Engine and Airplane Corporation, Farmingdale, N. Y., a corporation of Maryland Application October 12, 1946, Serial No. 703,007

7 Claims. (Cl. 74—471)

1

This invention relates to motion control mechanism, and has particular reference to mechanism for controlling one or more members requiring a motion differing from the input motion.

In operation of an airplane engine, for example, a number of engine parts or accessories may be and frequently are operated simultaneously with the throttle, for example, but each requires a different movement than that which is applied to the throttle. Similarly, flaps and other movable lift surfaces of an airplane, each requiring different movements, are frequently operated simultaneously. Other movable members in various parts likewise are operated simultaneously and in many cases operation and construction of such movable members would be greatly simplified if they were simultaneously operable by a single input movement.

In accordance with the present invention, a motion control mechanism is provided which is adaptable to controlling a number of different members simultaneously from a single input, even though each of said controlled members requires a different movement from the input movement and from the movements required to operate the other controlled members.

In a preferred embodiment of the invention, the input movement, preferably applied by flexible power transmission arrangement such as a Bowden wire or its equivalent, is connected to a pivoted lever in turn connected to the follower of a cam having a contour conforming to the movement required by the member which is to be operated, so that its follower actuates another lever connected to the controlled member in accordance with its required movement, preferably through another flexible power transmission. By connecting the input lever to the followers of additional cams, each having a different contour, any number of separate members may be operated in accordance with their requirements from the same input member, notwithstanding that the single input movement is different from the several requisite output movements.

It will be seen that the motion control mechanism of this invention, particularly when applied to multiple control service is an extremely simple but effective mechanism, whereby various engine parts, airplane lift surfaces and the like, may be simultaneously controlled from a single control member, such as a throttle lever, treadle, or the like.

For a more complete understanding of the invention, reference may be had to the accompanying drawings, in which:

2

Fig. 2 is an elevation of the output side of the mechanism of this invention; and Fig. 3 is an axial section through the device as seen along the line 3—3 of Fig. 1, and illustrates a multiple arrangement whereby numerous output movements may be effected from a single input movement in accordance with the invention.

Figure 1:
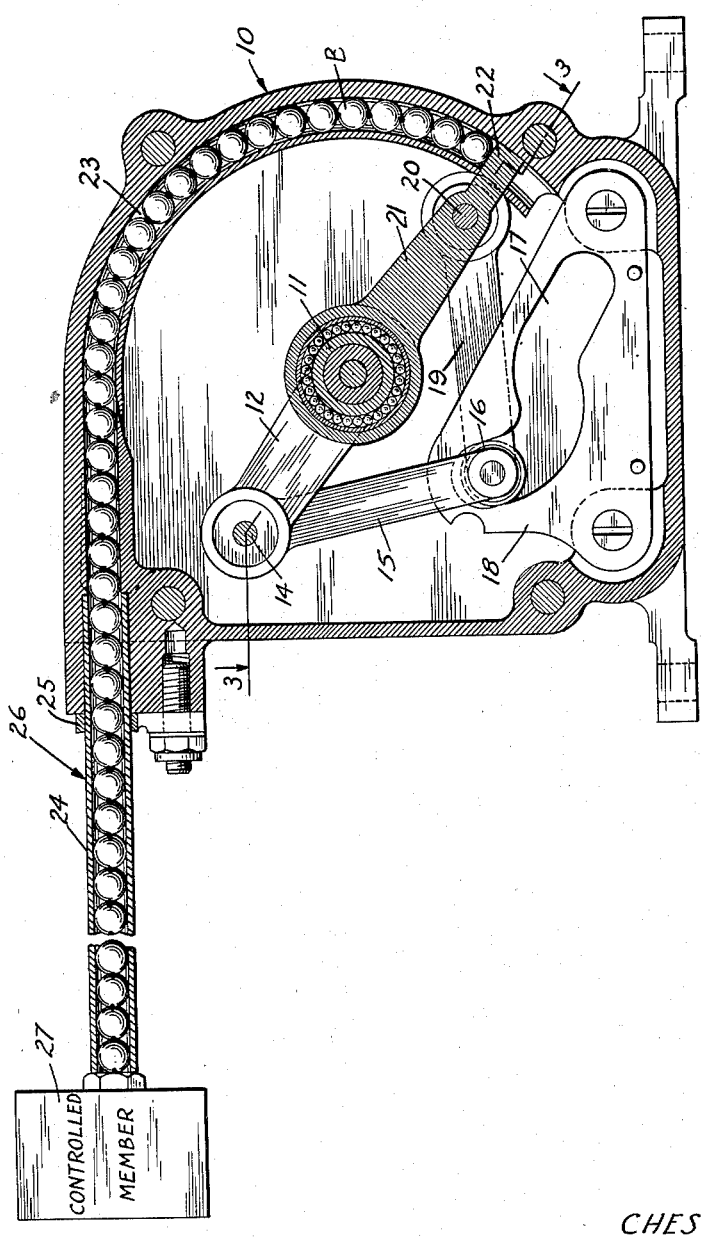
Figure 1 illustrates a transverse section through the variable motion mechanism of this invention, as seen along the line 1—1 of Fig. 2.

Referring to Fig. 1 of the drawings, numeral 10 designates a casing, preferably of quadrantal contour, as shown in Fig. 1. Journalled in the end walls of the casing at the center of curvature thereof is a tube 11 having integral levers 12 near its ends and within the casing 10 and connected to an operating lever 13 outside the casing 10. Operating lever 13 is actuated by a throttle or other operating means or member, not shown.

Extending between and rotatably carried by levers 12 within casing 10 is a transverse bar 14 on which is pivoted a series of links 15 each carrying a cam-following roller 16 at its other end, one of which is shown in Fig. 1. Each roller 16 follows the contour of a corresponding cam 17, which may be of the slot type formed in a cam plate 18 screwed or otherwise fastened in the interior of casing 10, as shown in Fig. 1. Although the contours of cams 17 differ according to the output movement desired, the operating mechanism is the same for each so that only one such cam need be shown for purposes of illustration.

Connected to and driven by each cam-following roller 16 is another link 19 pivoted on pin 20 of corresponding lever 21, which in turn is journalled on tube 11 and is independent of levers 12, as shown especially in Fig. 3. The extending free end 22 of each lever 21 is connected to one end of a flexible motion transmission means, such as Bowden wire, for example, or an equivalent like the push-pull Simmons ball chain type of flexible cable shown, wherein connected balls B are confined within corresponding slots 23 in the housing 10, each of which communicates with a corresponding flexible metal tube 24 carried by a coupling 25 secured on the housing 10, as shown in Fig. 1. The flexible cable thus formed and generally designated 26 may be any suitable length and extend in any direction to the remote controlled member 27 operated in accordance with the movement imparted to the transmission means therein by the corresponding cam 17, the remote member 27 being the throttle of an airplane engine, for example.

In operation of the control mechanism of this invention, the contour of the cams 17 determine the output movement imparted to the remote controlled member 27 through the cable 24 relatively to the input movement of the lever 13, although the size of the cam follower 16 and the length and location of the links 15 and 21 also have some bearing on the output movement. However, assuming for the purpose of illustration that each cam 17 determines the output movement of its corresponding transmission means 26, its shape with respect to the cam follower, the levers 12 and 21 and the links 15 and 19 is such as to impart the desired movement to the controlled member 27 to which output cable 24 is connected. Since the desired movement for the controlled member 27 is known, the contour of the corresponding cam 17 can be readily determined. Accordingly, when the lever 13 is moved with one motion, levers 21 and consequently controlled members 27 will each be moved with a different motion than that imparted to it by lever 13.

As indicated, the control mechanism of this invention lends itself admirably to multiple control of a number of near or remote members or units by means of a single input movement applied by lever 13. Thus, virtually any number of output levers similar to 21 may be arranged along tube 11 and connected by corresponding links 15 to the followers 16 of an equivalent number of differently-shaped cams 17 and their followers in turn connected by links 19 to output levers 21, as indicated in Fig. 3.

The output cables 24, of which four are shown in Fig. 2, all have movements which differ from each other to any required degree and differ from the input movement supplied by lever 13. Accordingly, by providing an arrangement, such as shown in Fig. 2, the great many control levers and cables used on aircraft, for example, may be eliminated or materially reduced and a compact, accessible, and readily serviceable unit utilized instead. Also, such units may be standardized and are simple to manufacture, since in most cases they require merely a different cam plate 18 to effect the corresponding movement required. It will be understood that equivalent hydraulic, electrical, or electro-mechanical transmission mechanisms, or mechanical transmission mechanisms other than those shown and described herein, may be used with equal facility in place of cable drives 26 shown in the drawings.

Although a preferred embodiment of the invention has been illustrated and described herein, it is to be understood that the invention is not limited thereby but is susceptible of changes in form and detail within the scope of the appended claims.

I claim:

1. In motion control mechanism, the combination of a plurality of driven members, a common driving member therefor, a first lever laterally spaced from said driving member and actuated about a pivotal axis by the driving member, a second lever for each driven member and connected thereto and pivoted about said axis, a stationary cam for each driven member, a follower for each cam, operative connections between each cam follower and a point adjacent the free end of the corresponding second lever, and operative connections between each cam follower and the free end of said first lever, whereby each driven member has a different motion than the driving member.

2. In motion control mechanism, the combination of a plurality of driven members, a common driving member therefor, a first lever laterally spaced from said driving member and actuated by the driving member about a pivotal axis, a second lever for each driven member and connected thereto and pivoted about said axis, a stationary cam for each driven member, a follower for each cam, a link interposed between each cam follower and a point adjacent the free end of the corresponding second lever, a bar extending parallel to said axis from the free end of said first lever and movable therewith, and a link interposed between each cam follower and said bar, whereby each driven member has a different motion than the driving member.

3. In motion control mechanism, the combination of a plurality of driven members, a common driving member therefor, a first lever actuated by the driving member and spaced therefrom, a second lever for each driven member, a stationary cam for each driven member, a follower for each cam, operative connections between each cam follower and a point adjacent the free end of the corresponding second lever, operative connections between each cam follower and the free end of said first lever, and remote power transmission means between each of said driven members and the corresponding second levers, whereby each driven member has a different motion than the driving member.

4. In motion control mechanism, the combination of a plurality of driven members, a common driving member therefor, a first lever spaced from said driving member and actuated about a pivotal axis by the driving member, a second lever for each driven member pivoted about said axis, a stationary cam for each driven member, a follower for each cam, a link interposed between each cam follower and a point adjacent the free end of the corresponding second lever, and driving connections including a link interposed between each cam follower and the free end of said first lever, and remote power transmission means between each of said driven members and the corresponding second levers, whereby each driven member has a different motion than the driving member.

5. In a motion transmitting mechanism, the combination of a casing, a plurality of driven members, said casing having a plurality of arcuate slots in a wall thereof corresponding to said driven members, a common driving member for said driven members, a first lever in said casing laterally spaced from said driving member and actuated by the driving member about an axis coincident with the center of curvature of said slots, second levers in said casing corresponding to said driven members pivoted about said axis, an extension for each said second lever extending into said casing wall slot corresponding thereto, a cam fixed in said casing for each of said driven members, a follower for each cam, operative connections between each said cam follower and the corresponding second lever, operative connections between each said cam follower and said first lever, and flexible means in each slot connecting the corresponding second lever extension to the corresponding driven member, whereby each driven member has a different motion than the driving member.

6. In a motion transmitting unit, the combination of a rotatably mounted shaft, a driving member connected to rotate said shaft, a second shaft disposed in spaced parallel relationship to said first shaft and secured thereto, said second shaft thereby being disposed to revolve about the center line of said first shaft upon rotation of the latter, a plurality of driven members remotely disposed with respect to said unit, a plurality of cams one corresponding to each of said driven members, a follower for each cam, a plurality of levers one corresponding to each of said cams and pivotally mounted on said first shaft, a plurality of first links connecting corresponding cam followers and levers, a plurality of second links connecting said cam followers to said second shaft, and operative driving connections between each of said levers and corresponding driven members whereby each driven member is actuated by said driving member in a manner characterized by the cam corresponding thereto.

7. In a motion transmitting unit, the combination of a housing, a rotatably mounted shaft, a driving member connected to rotate said shaft, a pair of parallel first levers secured to said first shaft and axially spaced thereupon and extending radially outwardly therefrom, a second shaft disposed in spaced parallel relationship to said first shaft and supported by said first levers, said second shaft thereby being disposed to revolve about the center line of said first shaft upon rotation of the latter, a plurality of driven members remotely disposed with respect to said unit, a plurality of cams disposed within the said housing one corresponding to each of said driven members, a follower for each cam, a plurality of second levers one corresponding to each of said driven members and pivotally mounted upon said first shaft, a plurality of first links connecting corresponding second levers and cam followers, a plurality of second links connecting said cam followers to said second shaft, and operative driving connections between each of said second levers and corresponding driven members whereby each driven member is actuated by said driving member in a manner characterized by its corresponding cam.

CHESTER C. DE PEW.

REFERENCES CITED

The following references are of record in the file of this patent:

UNITED STATES PATENTS

| Number | Name | Date |
| --- | --- | --- |
| 1,100,482 | Herzmark | June 16, 1914 |
| 2,087,378 | Goepfrich | July 20, 1937 |
| 2,299,583 | Loewy | Oct. 20, 1942 |
| 2,398,100 | Lear | Apr. 9, 1946 |
| 2,406,872 | Waite | Sept. 3, 1946 |
| 2,448,696 | Arens | Sept. 7, 1948 |